US012247727B2

(12) United States Patent
Machate et al.

(10) Patent No.: US 12,247,727 B2
(45) Date of Patent: Mar. 11, 2025

(54) MOUNTING RAIL FOR LUMINAIRES OR ELECTRIC UNITS

(71) Applicant: ZUMTOBEL LIGHTING GMBH, Dornbirn (AT)

(72) Inventors: Andreas Machate, Wangen im Allgäu (DE); Vamberszky Klaus, Bregenz (AT)

(73) Assignee: Zumtobel Lighting GmbH, Dornbirn (AT)

( * ) Notice: Subject to any disclaimer, the term of this patent is extended or adjusted under 35 U.S.C. 154(b) by 427 days.

(21) Appl. No.: 17/767,481

(22) PCT Filed: Oct. 1, 2020

(86) PCT No.: PCT/EP2020/077512
§ 371 (c)(1),
(2) Date: Apr. 8, 2022

(87) PCT Pub. No.: WO2021/069301
PCT Pub. Date: Apr. 15, 2021

(65) Prior Publication Data

US 2024/0027040 A1 Jan. 25, 2024

(30) Foreign Application Priority Data

Oct. 8, 2019 (DE) ..................... 10 2019 126 955.5

(51) Int. Cl.
*H01R 25/14* (2006.01)
*F21V 21/35* (2006.01)
(Continued)

(52) U.S. Cl.
CPC ............ *F21V 23/002* (2013.01); *F21V 21/35* (2013.01); *H01R 25/14* (2013.01); *H01R 25/142* (2013.01); *H01R 25/145* (2013.01); *F21V 21/025* (2013.01)

(58) Field of Classification Search
None
See application file for complete search history.

(56) References Cited

U.S. PATENT DOCUMENTS

| | | | | |
|---|---|---|---|---|
| 3,704,437 A * | 11/1972 | Hesse | .................... | H01R 25/14<br>439/117 |
| 3,757,273 A * | 9/1973 | Hesse | .................. | H01R 25/142<br>439/117 |

(Continued)

FOREIGN PATENT DOCUMENTS

| | | | | |
|---|---|---|---|---|
| DE | 695394 | 8/1940 | | |
| DE | 3024244 A * | 1/1981 | ............ | H01R 25/14 |

(Continued)

OTHER PUBLICATIONS

PCT/EP2020/077512, International Search Report and Written Opinion dated Nov. 27, 2020, 6 pages.

*Primary Examiner* — Tho D Ta
(74) *Attorney, Agent, or Firm* — Andrus Intellectual Property Law, LLP

(57) ABSTRACT

The invention relates to a mounting rail (1) for luminaires (100, 150) or electric units, having a mounting rail profile (2) with two lateral walls (4) and a connecting wall (5) which connects the lateral walls (4) to each other, said walls together enclosing an elongated receiving chamber (3), and having at least one busbar (10, 20) which is arranged on one of the two inner faces of the lateral walls (4) of the mounting rail profile (2) and which comprises contactable lines (15, 25). According to the invention, an additional busbar (30) with contactable lines (35) is arranged on the connecting wall (5) of the mounting rail profile (2).

24 Claims, 5 Drawing Sheets

(51) Int. Cl.

| | |
|---|---|
| ***F21V 23/00*** | (2015.01) |
| *F21V 21/02* | (2006.01) |

(56) References Cited

U.S. PATENT DOCUMENTS

| | | | |
|---|---|---|---|
| 4,919,625 | A | 4/1990 | Coutre |
| 2010/0126105 | A1 | 5/2010 | Boss |

FOREIGN PATENT DOCUMENTS

| | | | | | |
|---|---|---|---|---|---|
| DE | 20 2004 020011 | | | 3/2005 | |
| DE | 202004020011 | U1 | * | 4/2005 | ........... H01R 13/514 |
| DE | 102005040859 | A1 | * | 7/2006 | ........... H01R 13/514 |
| DE | 10 2006 018845 | | | 9/2007 | |
| DE | 102006011845 | A1 | * | 9/2007 | ................ F21S 8/06 |
| EP | 2287977 | A1 | * | 2/2011 | ................ F21S 4/20 |
| EP | 2287978 | | | 2/2011 | |
| GB | 1103307 | | | 2/1968 | |
| NL | 7010257 | A | * | 2/1971 | ............. H01R 25/14 |
| WO | 200191250 | | | 11/2001 | |

* cited by examiner

MOUNTING RAIL FOR LUMINAIRES OR ELECTRIC UNITS

CROSS-REFERENCE TO RELATED APPLICATION

The present application is the U.S. national stage application of international application PCT/EP2020/077512 filed Oct. 1, 2020, which international application was published on Apr. 15, 2021 as International Publication WO 2021/069301 A1. The international application claims priority to German Patent Application 10 2019 126 955.5. filed Oct. 8, 2019.

FIELD OF THE INVENTION

The present invention relates to a mounting rail for luminaires or electric units, which has a mounting rail profile in which at least one busbar is arranged extending longitudinally with respect to the mounting rail profile. Furthermore, the invention relates to a light strip system comprising such a mounting rail as well as a luminaire or an electric unit provided for use in such a light strip system.

BACKGROUND OF THE INVENTION

Mounting rails with a mounting rail profile as well as a busbar retained in the mounting rail profile are known from the prior art and are used, for example, to implement elongated so-called light strip systems. A known light strip system is sold by the Applicant under the name "TECTON" and is characterized in that luminaires or other electric consumers can be flexibly positioned on the mounting rail over the entire length of the system. This is made possible by the fact that, due to a special mounting of the lines of the busbar, they are accessible to the consumers over the substantially entire length of the light strip system, so that contact of the lines can occur not only at fixed predetermined positions, but rather at any desired location. For example, WO 2001/091250 A1 shows such a light strip system.

In the "TECTON" system mentioned above, two busbars are arranged opposite one another on the two lateral walls of a U-shaped mounting rail profile that is open downwardly. The contacting of the lines of the busbars is then carried out in that the luminaire or the consumer comprises a rotatable contacting element, which is inserted into the mounting rail from the bottom side and subsequently rotated by about 45°. Contacts arranged on the contacting element are designed in such a way that they are laterally pivoted outwardly by the rotation and ultimately contact the lines of the busbars in the rotated state.

The underlying problem of the present invention is to provide a mounting rail of the above-mentioned type, which, in comparison to the prior art, enables even more flexible connection possibilities for electric consumers, luminaires, or other units.

The problem is solved by a mounting rail having the features of claim 1. Advantageous further developments of the invention are the subject matter of the dependent claims.

As in the prior art, it is provided that the mounting rail according to the invention comprises a mounting rail profile, which, along with two lateral walls, as well as a connecting wall connecting the lateral walls, encloses an elongated receiving chamber, on whose lateral walls at least one busbar with contactable lines is arranged. According to the invention, there is now provided an additional busbar, which is arranged on the connecting wall of the mounting rail profile and likewise comprises contactable lines. This increases the number of available lines, thereby expanding the connection possibilities for a wide variety of consumers or luminaires, and—as explained in more detail below—also allowing a more flexible arrangement of luminaires or other electrical consumers on the mounting rail.

SUMMARY OF THE INVENTION

According to the present invention, therefore, a mounting rail for luminaires or electric units is proposed, which comprises:

- a mounting rail profile with two lateral walls and a connecting wall which connects the lateral walls to each other, said walls together enclosing an elongated receiving chamber,
- at least one busbar which is arranged on one of the two inner faces of the lateral walls of the mounting rail profile having contactable lines, wherein, according to the invention, an additional busbar with contactable lines is arranged on the connecting wall of the mounting rail profile.

According to a first variant, the additional busbar provided according to the invention, which is also arranged in the elongated receiving chamber of the mounting rail profile, can be substantially identical in design to the busbar arranged on the inner lateral wall. In this variant, in particular, the number of available contactable lines is increased, thereby increasing the flexibility in the arrangement of consumers or luminaires on the mounting rail.

Alternatively, however, the additional busbar can also be designed differently from the busbar arranged on the inner face of the lateral wall, wherein, according to a particularly preferred variant, it can be provided that at least some of the lines of the additional busbar can be contactable at least in sections from outside the receiving chamber of the mounting rail profile. This means that not only luminaires or electric units inserted into the receiving chamber of the mounting rail profile are enabled to contact the lines of the additional busbar; rather, there is now also the option of arranging additional consumers or other components outside this receiving chamber or generally outside the mounting rail profile, which can then contact the lines of the additional busbar. This not only improves the flexibility in positioning the units to be connected to the mounting rail; rather, completely new components can be connected to the mounting rail in order to expand the functionality of the light strip system.

According to a particularly preferred embodiment, it is provided that the connecting wall of the mounting rail profile is designed to be profiled such that an elongated channel is formed in which the additional busbar is arranged. This results in the lines of the additional busbar being made particularly easily accessible for the luminaires or units contacting from the outside, so that the arrangement of corresponding components outside the mounting rail is designed in a particularly simple manner.

The walls of the channel or the mounting rail profile in which the additional busbar is arranged can comprise openings or regions to be opened, which allow access to the lines that are contactable from outside the receiving chamber. These regions to be opened can in particular be formed by die-cuttings or other incisions, which form bendable tabs or break-away regions in the wall of the channel or the mounting rail profile. In this case, the contactable lines are first covered by walls of the mounting rail profile. If necessary, however, corresponding openings can be created in the walls in order to then easily provide a possibility for contacting.

In a variant of the invention, it can be provided that the lines of the additional busbar provide a low-volt supply voltage for consumers to be connected. In this case, it would also be conceivable that, by contrast, the lines of the busbar arranged on the lateral wall provide a high-volt supply voltage, wherein the additional busbar is supplied in sections by power supply means, which contact the busbar arranged on the lateral wall. That is to say, the busbar available up to now also serves as a source of power supply for the lines of the additional busbar, so that consumers who, for example, require a suitable low-volt supply voltage can be connected directly to the respective lines. For example, it would be conceivable to use luminaires with LED light sources across these sections of the additional busbar, which then no longer require their own converter or driver, but rather can directly use the voltage available on the additional busbar.

Ideally, busbars are arranged on both lateral walls of the mounting rail profile, wherein the lines of these busbars are supported in such a way that they are exclusively contactable from the inner face of the receiving chamber. Preferably, it is provided that the lines of the busbar are supported in a line retention profile consisting of an insulating material, which forms grooves opening towards a contacting side. This allows the lines to be designed continuously contactable at least over certain sections, ideally over the entire length of the mounting rail. This enables a particularly flexible arrangement of the different consumers, because they can be arranged at any place on the mounting rail. In particular, the line retention profile can be designed to form the retention for the lines of all busbars arranged in the receiving chamber of the mounting rail.

According to the present invention, a luminaire or electric unit for connecting to a mounting rail, as explained above, is furthermore proposed, wherein the luminaire or the consumer comprises a contacting element for electrically contacting lines of the busbars. In particular, it is provided that the contacting element comprises at least one first contact for contacting a line of the busbar arranged on a lateral wall and at least one second contact for contacting the additional busbar arranged on the connecting wall. That is to say, it is also quite conceivable for consumers according to the present invention to have contacts aligned in different directions in order to be able to flexibly contact the different busbars in the receiving chamber of the mounting rail. One conceivable solution here is that the contacting element comprises a rotatably supported body on which the first contact is arranged laterally, and that the second contact is additionally arranged on a contact carrier that does not rotate along with the body.

Furthermore, according to the present invention, a luminaire or electric unit for connecting to a mounting rail as explained above is proposed, wherein the luminaire or the consumer comprises contacting means for electrically contacting lines of the various busbars, and wherein the contacting means comprise:

a) a first contacting element having at least one first contact for contacting a line of the busbar arranged on a lateral wall, and b) a second contacting element separate from the first contacting element and having at least one second contact for contacting the busbar arranged on the connecting wall.

Finally, according to a further aspect, the present invention also relates to a special design of a busbar, which in this case is preferably arranged on the connecting wall of the mounting rail. In this context, it must be taken into account that mounting rails in which only a single busbar is used are already known from the prior art, wherein the busbar is then arranged on the connecting wall of the usually U-shaped mounting rail profile. In this case, all lines of the busbar are then supported such that they are contactable accordingly upon fastening of the luminaire to the mounting rail, so that the use of relatively simply designed contacting means is possible. In this case, too, however, the connection possibilities of the mounting rail are limited, for which reason, according to this further aspect according to the invention, it is provided that the busbar comprises two regions with contactable lines arranged next to one another, which regions are arranged offset from one another when viewed transversely from the longitudinal direction of the system.

According to this further aspect according to the invention, a mounting rail for luminaires or electric units is proposed, which comprises:

a mounting rail profile enclosing an elongated receiving chamber, as well as a busbar arranged in the mounting rail profile, said busbar having contactable lines, wherein the busbar comprises at least two adjacently arranged regions with contactable lines, wherein one of the two regions is designed to be rearwardly offset from the other region when viewed transversely in the longitudinal direction.

This particularly formed busbar, which can also be used as an additional busbar in the first explained aspect according to the invention, again opens up the possibility of forming additional connection possibilities for the mounting rail or the light strip system realized therewith, due to the fact that one of the regions is positioned in a rearwardly offset fashion.

According to a preferred embodiment, it can be provided that the busbar is symmetrically formed and comprises three regions arranged next to one another, wherein the two outer regions extend in a common plane, and the middle region is designed to be offset from the outer regions.

As already mentioned, it can be provided that this specially designed busbar is in particular arranged on the connecting wall of a U-shaped mounting rail profile. It can be provided that at least some of the lines of the rearwardly offset region of the busbar are contactable at least in sections from outside the mounting rail profile, wherein the corresponding wall of the mounting rail profile is in turn preferably designed to be profiled such that an elongated channel extending the receiving chamber is formed, in which channel the rearwardly offset region of the busbar is arranged. As already described above, it can be provided that walls of the channel comprise openings or regions to be opened, which allow access to the contactable lines from outside the mounting rail profile. The regions to be opened can in particular be formed by die-cuttings, which form bendable tabs or break-away regions in the wall of the channel.

The lines of the busbar designed according to the invention are supported in a line retention profile consisting of an insulating material, which profile forms grooves or channels opening towards a contacting side, wherein the different regions of the busbar preferably use a common line retention profile.

BRIEF DESCRIPTION OF THE DRAWINGS

The invention will be explained in further detail in the following with reference to the accompanying drawing. The figures show.

DETAILED DESCRIPTION

Figure 1:
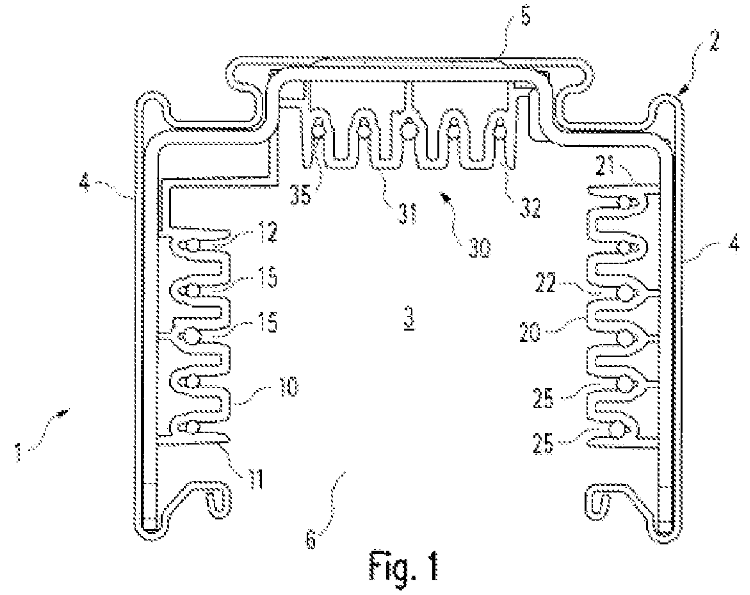
FIG. 1 is a first exemplary embodiment of a mounting rail according to the invention.

The figures show different embodiments of a mounting rail 1 according to the invention for implementing a light strip system to which luminaires or other units can be connected. The mounting rail 1 shown in FIG. 1 comprises an elongated mounting rail profile 2, which limits an internal space 3. As can be seen in the various views, the mounting rail profile 2 can have a substantially U-shaped cross-section when viewed in a longitudinal direction, with a connecting wall 5 as well as two lateral walls 4 extending away and preferably downwardly parallel from the connecting wall 5, which together define the receiving chamber 3. The mounting rail profile 2 thus has an open longitudinal side or opening 6, via which the receiving chamber 3 is accessible from the bottom side. However, instead of the U-shaped cross-section shown, it could also be provided that the mounting rail profile 2 is, for example, formed in an H-shape or otherwise. What is essential is that it, along with two lateral walls 4 and a connecting wall 5, encloses an elongated receiving chamber 3 that opens to one side and is used for the arrangement of busbars as explained below.

For example, the mounting rail profile 2 can be formed from a sheet metal, in particular as a die-cut bending part or also from a thin metal material and, in this case, then produced in an extrusion process, for example. The mounting rail profile 2 represents the supporting element of the mounting rail 1 and can, for example, be attached to a beam, for example to the ceiling of a space to be illuminated or to suspension elements, by means of brackets not shown in more detail.

To supply power to luminaires or other units that are to be connected to the mounting rail 1, two busbars 10 or 20 are initially provided within the receiving chamber 3 on the inner faces of the two lateral walls 4. Each of these comprises a plurality of lines 15 or 25, which are arranged parallel to the lateral walls 5 and supported one above the other such that they are contactable from a contacting side for units to be connected to the mounting rail 1.

It should be noted that contacting the lines of a busbar does not necessarily serve to supply power to the unit to be connected. The connection to data lines used for communication would also be conceivable, in particular, the connection of sensors, cameras or similar components that transmit data via the lines of the light strip system, which are then used, e.g., for automated control of the system, would also be conceivable. In this sense, the present invention encompasses all conceivable electric units that can be sensibly connected to a busbar.

As is already the case with the above-mentioned known mounting rail system “TECTON”, the lines 15 or 25 are preferably retained by corresponding, insulating material-line retention profiles 11 or 21, which are parallel, open grooves towards the interior of the mounting rail profile 2, respectively channels 12, 22 in which the lines 15, 25 are arranged in the form of wires. The lines 15, 25 are thereby accessible across a longer section, ideally across the entire length of the mounting rail system 1, and are thereby contactable for the luminaires or units to be connected. In particular, it can be provided that the line retention profiles 11 or 21 are formed by a plurality of plastic profile parts arranged in a longitudinal direction in a succession and connectable to one another, as is known in the prior art. This solution opens up the possibility of creating continuously accessible channels 12 extending over the entire length of the system 1, so that contacting of the lines 11 and 21 can occur at any place. However, the present invention also includes solutions in which the busbar sections are connected to one another at certain transition points such that no contacting of the lines 15 or 25 is possible here. In this case, the line retention profiles 11, 21 could then also be manufactured in a more cost-efficient manner or in a simpler manner, for example in an extrusion process.

With regard to the embodiments thus far, the mounting rail 1 shown in FIG. 1 corresponds to the solutions already known from the prior art.

According to the invention, however, it is now provided that, in addition to the two busbars 10 or 20 arranged on the lateral walls 4 of the mounting rail profile 2, a further busbar 30 is provided, which is arranged on the connecting wall 5 and thus on the upper side of the receiving chamber 3 of the mounting rail profile 2. This additional mounting rail 30 also serves to receive and support longitudinally extending lines 35, which, in the illustrated case, are arranged in grooves or channels 32 of a line retention profile 31, said grooves or channels extending in the longitudinal direction and opened towards the internal space 3 of the mounting rail profile 2.

Analogously to the first two busbar bars 10 and 20, it can also be provided for the third busbar 30 that the line retention profile 31 is formed by a plurality of plastic parts that are arranged one after the other in a longitudinal direction and can be connected to one another. In a particularly preferred embodiment, as shown in FIG. 1, it can in particular be provided that the three line retention profiles 11, 21, 31 of the three busbars 10, 20 and 30 are formed by commonly used plastic parts. These can be manufactured by injection molding or extrusion methods and can be angled or folded accordingly before being arranged in the mounting rail profile 20, such that they abut the three walls 4 and 5 of the mounting rail profile 2 with their respective sections and here form the respective line retention profiles 11, 21, 31 of the three busbars 10, 20 and 30.

Ultimately, therefore, lines 35 that additionally extend within the mounting rail 1 are provided by the further busbar 30, which lines can be used in order to provide further supply voltage types or as additional data lines for signal transmission. The different orientation of the receiving channels or grooves 32 for the additional lines 31 also opens up the possibility of connecting consumers to the mounting rail, said consumers having differently designed contacting elements in order to contact the different lines of the busbars 10, 20 and 30, respectively. The flexibility of the mounting rail

1 with regard to the use of a variety of luminaires and/or other units is thereby further increased.

Figure 2:
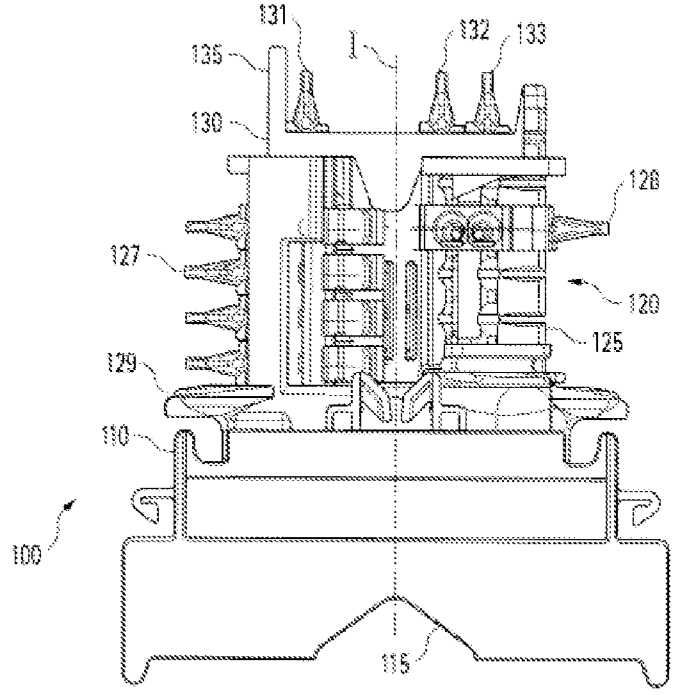
FIG. 2 is an exemplary embodiment of a consumer to be connected to the mounting rail according to FIG. 1, having a contacting element designed according to the invention.
Figure 3:
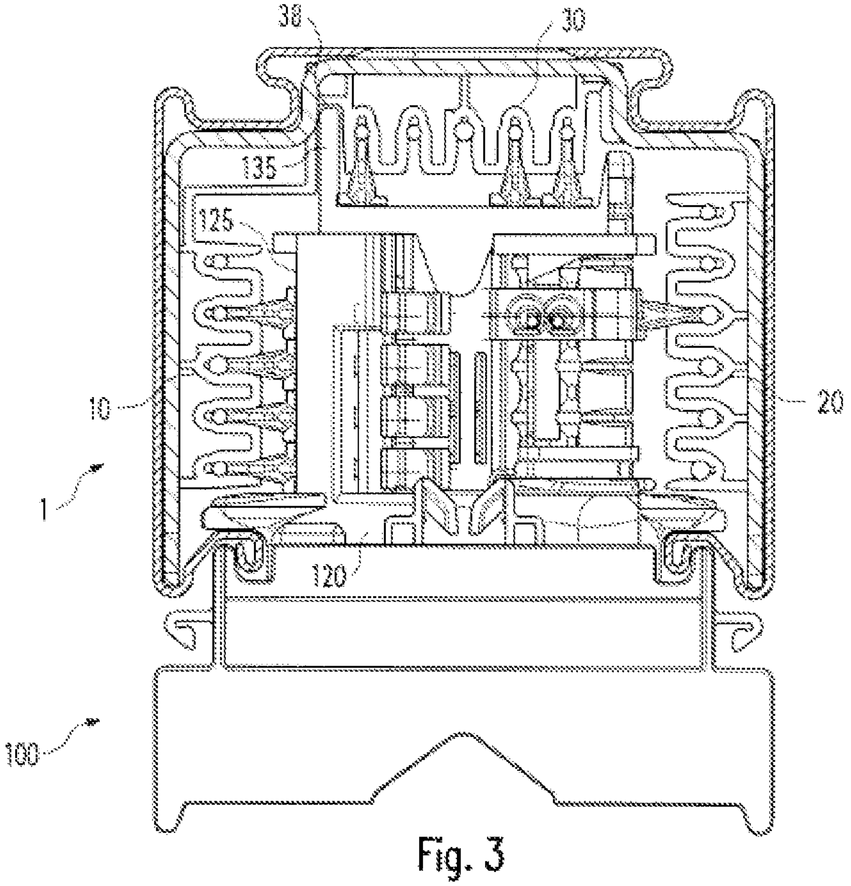
FIG. 3 is a sectional view of the mounting rail of FIG. 1, with the consumer inserted therein.

Ideally, it can be provided that a consumer is designed in order to contact, in principle, all of the lines of the three busbars 10, 20, 30. FIGS. 2 and 3 show in this regard for example a bar luminaire bearing the reference numeral 100, which is provided for connecting to the mounting rail 1 according to FIG. 1.

In a known manner, this luminaire 100 initially comprises a longitudinally extending beam 110, which serves to support illuminants (not shown) and also holds an optical element 115 at its bottom, which is provided for influencing the light emitted by the illuminants. In the illustrated exemplary embodiment, an optic 115 is shown, which is designed to influence the light of LEDs, wherein the use of any illuminants as well as corresponding optics or other covers would in principle be conceivable.

The contacting element 120, which is responsible for contacting the lines 15, 25, 35, is provided on the top side of the supporting element 110. In many details, it resembles the contacting elements already known from the prior art and thus comprises a central base body 125, which is rotatably and/or pivotably supported, and on whose sides a plurality of contacts 127 and 128 are arranged. These lateral contacts 127, 128 serve to contact the lines 15 and 25 of the first two busbars 10 and 20 and can—at least partially—be mounted in a height-adjustable manner on the base body 125. Thus, it can be selected which lines 15 and 25 of the busbars 10 and 20, respectively, are actually to be contacted, which in turn opens up the possibility of assigning the luminaire 100 to be connected or the consumer to be connected to a specific power supply circuit or assigning a specific function to them.

As is known, the base body 125 of the contacting element 120 is designed to be rotatable about a vertical axis I, wherein the contacts 127 and 128, respectively, are rotated together with the base body 125. This allows the contacting element 120 to be transferred from an open position into a contacting position, wherein, in an open position, the contacts 127, 128 are in a position in which the insertion of the contacting element 120 into the receiving chamber 3 of the mounting rail profile 2 is enabled. Only in the inserted state is the base body 125 of the contacting element 120 then rotated about the axis I, which results in the lateral contacts 127, 128 being pivoted outwardly and now engaging with the corresponding grooves 12, 22 and channels of the busbars 10, 20 in order to ultimately touch, i.e., contact, the lines 15, 25 located therein. This is shown in FIG. 3, which shows the arrangement of the bar luminaire 100 on the mounting rail 1, wherein the contacting element 120 is in the contacting position mentioned above.

It is now provided that an additional contact carrier 130 of the contacting element 120 with vertically aligned further contacts 131 to 133 is provided at the top of the base body 125. These additional contacts 131 to 133 serve to contact the lines 35 extending in the horizontally oriented busbar 30, wherein the option can in turn be provided that a selective contacting of the different lines 35 is enabled in that the contacts 131 to 133 are mounted in the horizontal plane and/or the vertical plane in an adjustable manner or can be inserted at different positions in this plane.

Of course, this additional contact carrier 130 of the contacting element 120 should not be rotated with the base body 125 such that there is a decoupling between the rotatable body 125 and the additional contact carrier 130 here. When inserting the contacting element 120 into the receiving chamber 3 of the mounting rail 1, the upper contact carrier 130 first comes into contact with the contacts 131 to 133 with the additional mounting rail 30, wherein, on the one hand, the lines 35 are contacted by the corresponding contacts 131 to 133, and, on the other hand, a guide element provided on the additional contact carrier 130 in the form of a rib or pin 135 engages with a corresponding guide groove 38 of the busbar 30, wherein the guide groove 38 can be formed in the line retention profile 31 of the busbar 30. This ensures the correct position of the upper contact carrier 130 with respect to the additional busbar 30 and a so-called anti-rotation protection. The inner part of the contacting element 120 is thus rigidly connected to the carrier of the inserted component, whereas the outer part is rotatably supported about it.

A further and preferred variant is to provide a component having two individual, spatially separated (spaced apart) contacting elements, such that the first contacting element contacts the lateral conductors and the second contacting element contacts the upper conductors. In this way, contacting elements known from the prior art can be used, for example a light strip luminaire with a so-called "rotation tap" and additionally a so-called "linear tap".

To connect the luminaire 100 to the mounting rail 1, the contacting element 120 is first inserted into the receiving chamber 3 as already explained above, such that the lines 35 of the horizontally-oriented busbar 30 are contacted by the upper contact carrier 130. Then, the rotatable base body 125 is rotated with the laterally aligned contacts 127 and 128 such that the contacts 127, 128 are pivoted outwardly and contact the lines 15, 25 of the busbars 10 and 20. In this case, it can also be provided that additional detent elements 129 are formed on the rotatable base body 125, which elements engage with corresponding projections in the mounting rail profile 2, so that a mechanical fastening of the luminaire 100 is ultimately also achieved on the mounting rail 1.

In the preceding explanations, it was assumed that the additional busbar 30 provides further lines 35, which are can be contacted simultaneously to the lines 15 and 25 of the first two busbars 10 and 20 by a single consumer. Finally, as previously described using the bar luminaire 100, this consumer can contact a plurality of different lines. This provides a variety of possibilities for connecting the consumer to power supply circuits and/or communication lines.

However, it would also be conceivable that the lines of the additional busbar 30 will be used to connect other or additional consumers or consumer types. This concept will be explained below with reference to the further figures.

Figure 4:
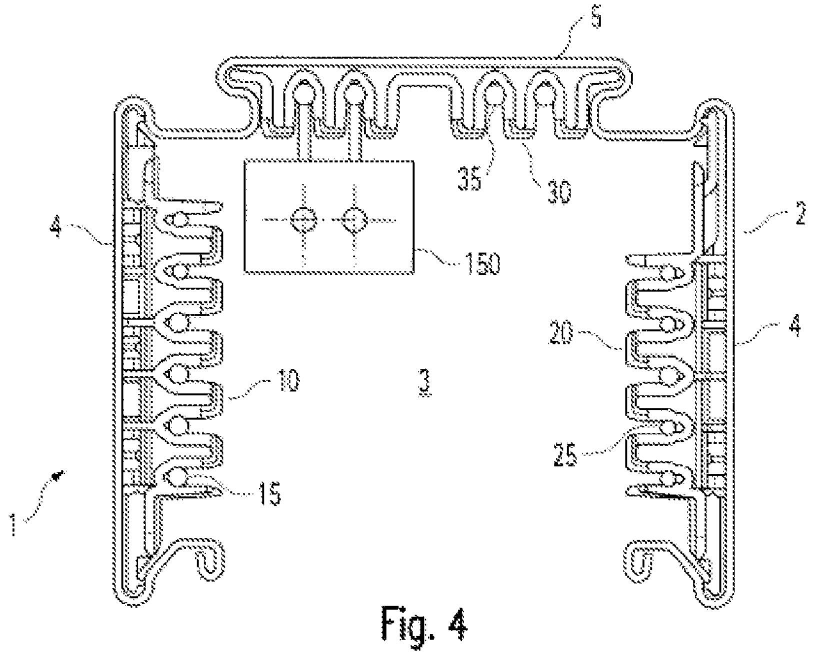
FIG. 4 is a further exemplary embodiment of a mounting rail according to the invention.

FIG. 4 initially shows a variant of a mounting rail 1 according to the invention, in which a third busbar 30 is in turn provided in addition to the busbar 10 and 20 arranged on the lateral walls 4, the lines 35 of which are accessible from the receiving chamber 3 of the mounting rail profile 2 and thus are contactable. In the present case, however, it is provided that a separate consumer shown purely schematically is provided exclusively for contacting these lines 35 of the third busbar 30. This additional consumer 150 can be, for example, a sensor or communication module provided only at certain places in the longitudinal direction of the system, which is not to impair the accessibility of the lines 15 or 25 of the busbars 10 or 20 provided for the actual consumers.

The variant shown in FIG. 4 thus opens up the possibility, for example, of connecting further components to the system using the additional busbar 30, wherein, however, the continuous connectability of the busbars 10 and 20 is not affected thereby and, accordingly, luminaires can still be arranged on the mounting rail 1 continuously and over the entire length of the system, in order to achieve a homogeneous light output extending over the entire length.

Figure 5:
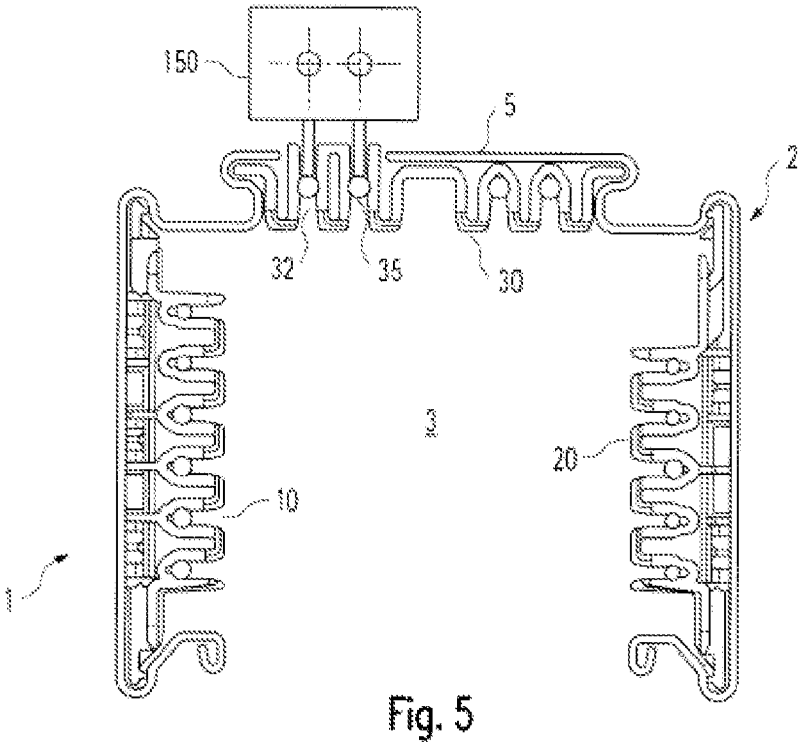
FIGS. 5 to 7 are variants of mounting rails designed according to the invention, wherein it is possible to contact the lines of the additional busbar from a region outside the mounting rail.

A particularly advantageous further development of the variant shown in FIG. 4 is shown in FIG. 5. It is provided here that the lines 35 extending in the third busbar 30 are also at least partially contactable from the upper side or outside of the mounting rail profile 2. This possibility is opened up in that the corresponding transverse connecting wall 5 is equipped with openings, wherein at the same time, in the region of these openings, the lines 35 are also arranged optionally in the line retention structure 31 such that they are contactable from the top side.

In this case, the corresponding bottom sides of the receiving channels 32 of the line retention profile 31 are thus equipped with slots or machined such that the lines 35 are contactable by a consumer 150 arranged outside of the mounting rail profile 2. In this case, the line retention profile 35 can be designed such that, at these locations, the lines 35 are simultaneously also accessible from the bottom and thus from the receiving chamber 3. However, it would also be conceivable that in these special sections, a contacting can actually only occur as shown from the top of the mounting rail 1.

The aforementioned openings required for this in the connecting wall 5 of the mounting rail profile 2 can either be permanently provided or optionally created by the consumer, in that the wall 5 is equipped with corresponding die-cuts or slots, such that break-away regions or bendable tabs are formed. Only in the event that a contact of the lines 35 by a consumer is actually provided in this region can the bending or opening of the tabs be carried out, so that otherwise the lines 35 and the internal space are reliably protected against external influences by the walls of the mounting rail profile 2.

Figure 6:
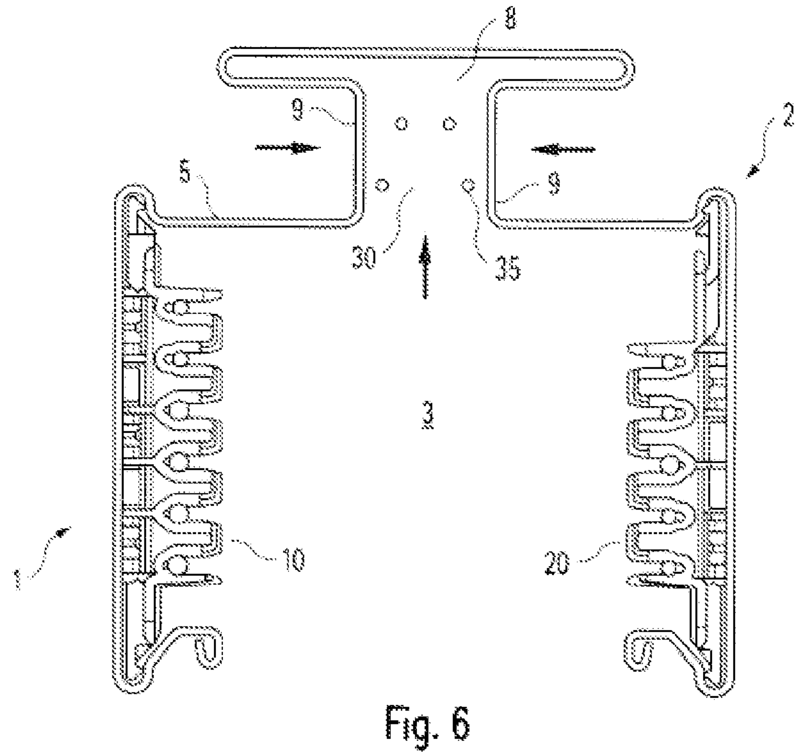
Figure 7:
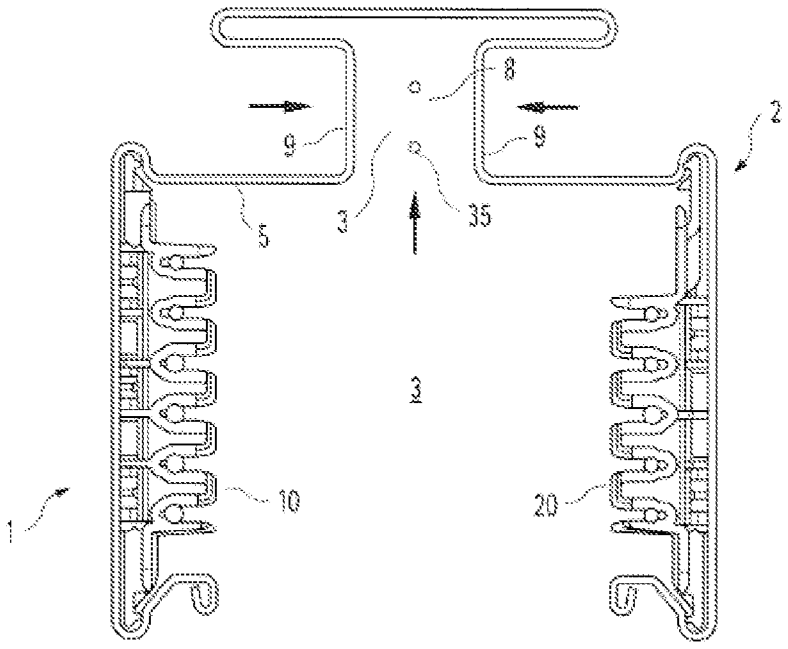
Figure 8:
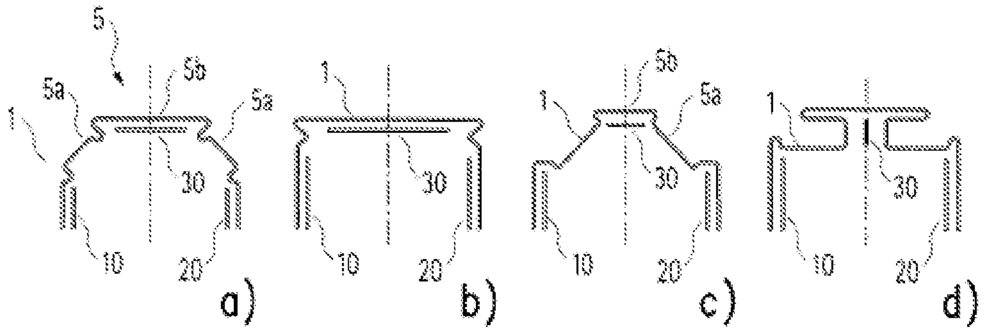
FIG. 8 is a further conceivable possibilities for implementing a mounting rail according to the invention.

Similarly, it is also provided in the exemplary embodiments of FIGS. 6 and 7 that the lines 35 of the third busbar 30 are accessible not only from the receiving chamber 3 of the mounting rail profile 2, but in particular can also be contacted from a position outside of the receiving chamber 3.

In the exemplary embodiments shown, which differ primarily with regard to the number and the mounting of the available lines 35 (the line retention profiles are not shown in this case for clarity), it is provided that the connecting wall 5 of the mounting rail profile 2 is designed to be profiled such that an additional elongated channel 8 is formed above the actual receiving chamber 3, in which channel the third busbar 30 is positioned. In particular, the lateral walls 9 of this channel 8 can then in turn be equipped at least in sections with corresponding openings or designed such that openings are created through which a contacting of the lines 35 of the additional mounting rail 30 is enabled. The arrows shown here symbolize the different directions, which now offer the possibility of contacting the lines 35, wherein a contacting from all three directions must not necessarily be possible at a specific longitudinal position simultaneously. Rather, it could be provided that the contacting direction for the additional busbar 30 changes in sections.

Both variants are characterized in that, despite the connectability of the lines 35 from outside the mounting rail profile 2, the risk of accidental touching of the lines 35 is excluded, because, due to the design of the mounting rail profile 2 and above all the busbar, the insertion of correspondingly designed contacting elements is possible at best. Furthermore, the additional busbar 30 does not take up any space within the actual receiving chamber 3 of the mounting rail profile 2, so that luminaires or consumers used thus far can also be used and connected to the mounting rail 1 in the customary manner.

Due to the fact that the lines of the third busbar 30 can now also be contacted from outside the mounting bus 1 in at least some of the exemplary embodiments, additional possibilities are created for connecting consumers or other components to the system. In a simple manner, consumers which are now also arranged on the outside of the system 1 can in particular be used. On the one hand, these can be luminaires that are then used, for example, to implement indirect lighting or accent lighting. However, other units that extend the functionality of the system, such as sensors, communication modules, or the like, can now also be connected to the system, in particular, wherein there is no longer the problem that these additional components might interrupt means provided at the bottom of the system for light output or need to be connected with high effort to the lines of the first two busbars that extend within the mounting rail. Ideally, it is desired to perform homogeneously and uniformly throughout the system, but in particular without interruption, a light output, because this results in a particularly appealing appearance of a light strip system. This is now readily possible, wherein additional components can be connected despite everything.

In this respect, it would be conceivable that each busbar is connected on the input side of the system to corresponding power supply lines or coupled to communication lines. Alternatively, however, it would also be conceivable that power supply circuits are only formed in sections with the aid of the lines, which circuits are fed from the lines of the first or second busbar. In particular, it can be provided that a normal supply voltage is provided via the first and second busbars, whereas the lines of the third busbar are provided with a low-volt supply voltage. However, this is then not coupled on the front side of the system, but rather converters or other components are provided in sections, which convert the high-voltage voltage of the first or second busbar into a low-volt supply voltage and then pass it on to the lines of the third busbar. In this way, the third busbar can be used as a low-volt busbar, for example, which is used to directly power LED lighting components. They no longer need their own converter or driver, but rather can be connected directly to the respective lines. Furthermore, in this case, the risk is also reduced that unintended touching of the lines of the additional busbar, which can be permissible in the case of low voltages that at least partially accessible from the outside, will lead to health problems or hazards.

Ultimately, the solution according to the invention results in a significantly increase of the possibilities for connecting and arranging consumers to a mounting rail in comparison to the mounting rails known thus far.

The invention is also not limited to the U-shape of a mounting rail as shown in FIGS. 1 to 7. FIGS. 8*a* to 8*d*, in which the arrangements of the different busbars are only shown schematically, show that the mounting rail can be implemented in a variety of cross-sectional shapes.

The variants of FIGS. 8*b* and 8*d* correspond to the exemplary embodiments described in FIGS. 1 to 5 or in FIGS. 6 and 7 in detail, wherein the lines of the additional busbar 30 could in principle be contactable from the inner face and/or in the manner described above from the outside of the mounting rail 1.

FIG. 8*a*, on the other hand, relates to a variant in which the connecting wall 5 which connects the two lateral walls 4 of the mounting rail 1 is designed to be angled so that oblique wall sections 5*a* are initially produced above the two lateral walls 4, which oblique sections are connected by a horizontal wall section 5*b*. In the case illustrated, the additional busbar 30 is arranged at the bottom of the horizontal wall section 5*a* and can in turn be contactable from the inner face and/or outside in the manner described above. However, alternatively or in addition, it would also be conceivable to arrange one or more additional busbars on the oblique wall sections 4*a*. These are then primarily suitable for contacting from the outside of the mounting rail 1 and could be used to supply power to external components of the system, such as luminaires for indirect lighting, individual radiators, sensors, or the like.

The same applies to the variant according to FIG. 8*c*, in which the connecting wall 5 is again angled and in which the oblique wall sections 5*b* could also be used for the arrangement of additional busbars in this case.

The various examples show that the shape of the mounting rail 1 can also certainly be selected according to the number and size (i.e., the number of lines extending in the busbar) of the busbars used. If, for example, components of the system are to be connected on both sides outside of the mounting rail 1, the variant according to FIG. 8*d* or one of the two variants of FIG. 8*a* or 8*c* can be primarily availed, wherein additional busbars must then be arranged on the oblique wall sections. If additional components of the system are to be arranged exclusively at the top side, however, the variant of FIG. 8*b* can preferably be availed.

Figure 9:
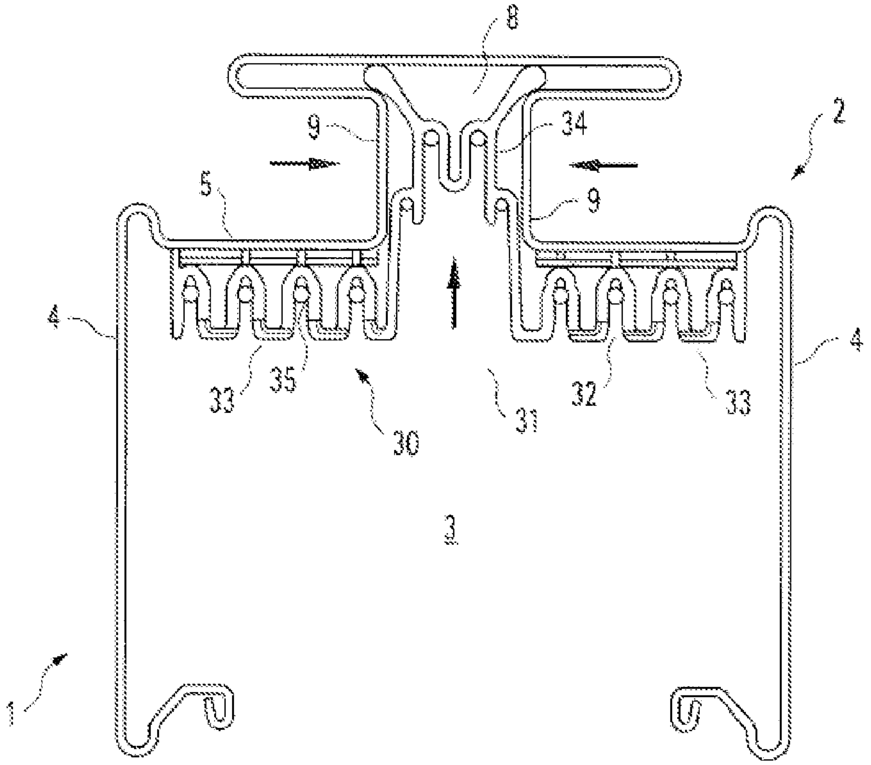
FIG. 9 is a further exemplary embodiment of a mounting rail in which the busbar is designed in a particularly advantageous manner.

Finally, a further exemplary embodiment of a mounting rail 1 according to the invention is shown in FIG. 9. In this case, a specially designed busbar 30 is arranged on the connecting wall 5 of the mounting rail profile 2, which is again U-shaped. This is designed to create improved contacting possibilities in comparison to solutions previously known. However, it would in principle also be conceivable to arrange additional busbars on the lateral walls 4 of the mounting rail profile 2 in addition to the busbar 30 shown. In this case, what was explained in connection with the exemplary embodiments of FIG. 1-8 then applies.

In the exemplary embodiment according to FIG. 9, the mounting rail profile 2 is designed in the same way as in FIGS. 6 and 7. The upper connecting wall 5 is thus designed to be profiled such that a channel 8 extending the receiving chamber 3 is formed. By contrast to the exemplary embodiment of FIGS. 6 and 7, however, the busbar 30 is now not exclusively arranged in this channel 8. Instead, it comprises two lateral regions 33 and a central region 34, wherein the middle region 34 is positioned in the channel 8 in a position that is rearwardly offset from the lateral regions 33, whereas the regions 33 are arranged in a plane at the bottom of the connecting wall 5. All three regions 33, 34 of the busbar 30 are, however, preferably formed by a common line retention profile 31, which in the manner described above comprises the channels and grooves 32 that open towards a contacting side for receiving the lines 35.

The lateral regions 33 of the busbar 30 are contactable exclusively from the bottom or the internal space of the mounting rail 1, as has previously been known. The middle region 34, which extends into the channel 8 and is rearwardly offset, is designed analogously to the exemplary embodiment of FIGS. 6 and 7 such that it can also be contacted from the receiving chamber 3, i.e., from the bottom, but on the other hand, it is possible, at least in sections, to contact the corresponding lines 35 from the side, as shown by the arrows, in particular from outside the mounting rail 1. For this middle region 34, there are thus more flexible possibilities for contacting compared to the regions 33, such that there are in turn additional possibilities for arranging electric components on the mounting rail 1.

In the case shown, that exclusively the busbar 30 shown in FIG. 9 is provided within the mounting rail profile 2, units to be connected to the mounting rail 1 from the bottom can in turn be designed with relatively simply designed contacting means, because the contacts do not have to be movable, but rather contact the corresponding lines 35 within the framework of insertion and fastening to the mounting rail 1. As already mentioned, at any rate, further busbars can be arranged on the lateral walls 4, wherein the consumers to be connected are designed in the manner described above with corresponding contacting means, which on the one hand can contact the lines of the busbar 30 as well as on the other hand the lines of the laterally arranged busbars (not shown).

Even when using a single busbar as shown in FIG. 9, improved contacting possibilities arise compared to previously known solutions, because, in addition to the lines that are contactable purely from the receiving chamber 3, there are also available lines which are contactable in the manner described above by units arranged outside the mounting rail profile 2.

The various examples thus make it clear that the present invention enables the implementation of extremely versatile designs for mounting rails, which offer a wide variety of possibilities for contacting.

The invention claimed is:

1. A mounting rail (1) for luminaires (100, 150) or electric units, said mounting rail comprising:

a mounting rail profile (2) with two lateral walls (4) and a connecting wall (5) which connects the lateral walls (4) to one another, said walls together enclosing an elongated receiving chamber (3), at least one busbar (10, 20) which is arranged on one of the two inner faces of the lateral walls (4) of the mounting rail profile (2) having contactable lines (15, 25), wherein an additional busbar (30) with contactable lines (35) is arranged on the connecting wall (5) of the mounting rail profile (2) and the additional busbar (30) is substantially identical in design to the busbar (10, 20) arranged on the inner face of the lateral wall (4).

2. The mounting rail according to claim 1, wherein the additional busbar (30) is designed differently from the busbar (10, 20) arranged on the inner face of the lateral wall (4).

3. The mounting rail according to claim 1, wherein busbars (10, 20) are arranged on both lateral walls (4) of the mounting rail profile (2).

4. The mounting rail according to claim 1, wherein the lines (15, 25) of the busbar(s) (10, 20) arranged on a lateral wall (4) of the mounting rail profile (2) are exclusively contactable from the inner face of the mounting rail profile (2).

5. A luminaire or electric unit (100, 150) for connecting to a mounting rail (1) according to claim 1:

wherein the luminaire or the electric unit (100, 150) comprises a contacting element (120) for electrically contacting lines (15, 25, 35) of the busbars (10, 20, 30), wherein the contacting element (120) comprises at least one first contact (127, 128) for contacting a line (15, 25) of the busbar (10, 20) arranged on a lateral wall (4) and at least one second contact (131, 132, 133) for contacting the busbar (30) arranged on the connecting wall (5).

6. The mounting rail according to claim 1 wherein the lines (35) of the additional busbar (30) provide a low-volt supply voltage for consumers to be connected.

7. The mounting rail according to claim 1, wherein the lines (15, 25, 35) of the busbars (10, 20, 30) are supported in line retention profiles (11, 21, 31) consisting of an insulating material, which profiles form grooves or channels (12, 22, 32) opening towards a contacting side.

8. The mounting rail according to claim 7, characterized in that all bus bars (10, 20, 30) use a common line retention profile.

9. A mounting rail (1) for luminaires (100, 150) or electric units, said mounting rail comprising:

a mounting rail profile (2) with two lateral walls (4) and a connecting wall (5) which connects the lateral walls (4) to one another, said walls together enclosing an elongated receiving chamber (3); and at least one busbar (10, 20) which is arranged on one of the two inner faces of the lateral walls (4) of the mounting rail profile (2) having contactable lines (15, 25), wherein an additional busbar (30) with contactable lines (35) is arranged on the connecting wall (5) of the mounting rail profile (2);

wherein the additional busbar (30) is designed differently from the busbar (10, 20) arranged on the inner face of the lateral wall (4) and at least some of the lines (35) of the additional busbar (30) are contactable at least in sections from outside the mounting rail profile (2).

10. The mounting rail according to claim 9, wherein the additional busbar (30) comprises at least two adjacently arranged regions (33, 34) with contactable lines (35), wherein one of the two regions (34) is designed to be rearwardly offset from the other region (33) when viewed transversely in the longitudinal direction.

11. The mounting rail according to claim 9, wherein the connecting wall (5) of the mounting rail profile (2) is designed to be profiled such that an elongated channel (8) extending the receiving chamber (3) is formed, in which channel the additional busbar (30) or the rearwardly offset region (34) of the additional busbar (30) is arranged.

12. The mounting rail according to claim 9, wherein walls (5, 9) of the channel (8) or of the mounting rail profile (2) in which the additional busbar (30) or the rearwardly offset region (34) of the additional busbar (30) are arranged comprise openings or regions to be opened, which allow access to the lines (35) that are contactable from outside the mounting rail profile (2).

13. The mounting rail according to claim 12, wherein the regions to be opened are formed by die-cuttings, which form bendable tabs or break-away regions in the wall (5, 9) of the channel (8) or the mounting rail profile (2).

14. A mounting rail (1) for luminaires (100, 150) or electric units, said mounting rail comprising:

a mounting rail profile (2) with two lateral walls (4) and a connecting wall (5) which connects the lateral walls (4) to one another, said walls together enclosing an elongated receiving chamber (3); and at least one busbar (10, 20) which is arranged on one of the two inner faces of the lateral walls (4) of the mounting rail profile (2) having contactable lines (15, 25), wherein an additional busbar (30) with contactable lines (35) is arranged on the connecting wall (5) of the mounting rail profile (2);

wherein the additional busbar (30) is designed differently from the busbar (10, 20) arranged on the inner face of the lateral wall (4) and the lines (35) of the additional busbar (30) provide a low-volt supply voltage for consumers to be connected.

15. The mounting rail according to claim 14, wherein the lines (15, 25) of the busbar (10, 20) arranged on the lateral wall (4) provide a high-volt supply voltage, wherein the additional busbar (30) is supplied in sections by power supply means that contact the busbar (10, 20) arranged on the lateral wall.

16. A luminaire or electric unit (100, 150) for connecting to a mounting rail (1), wherein the mounting rail comprises: a mounting rail profile (2) with two lateral walls (4) and a connecting wall (5) which connects the lateral walls (4) to one another, said walls together enclosing an elongated receiving chamber (3), and at least one busbar (10, 20) which is arranged on one of the two inner faces of the lateral walls (4) of the mounting rail profile (2) having contactable lines (15, 25), and an additional busbar (30) with contactable lines (35) is arranged on the connecting wall (5) of the mounting rail profile (2); and wherein the luminaire or the electric unit (100, 150) comprises: a contacting element (120) for electrically contacting lines (15, 25, 35) of the busbars (10, 20, 30), and the contacting element (120) comprises at least one first contact (127, 128) for contacting a line (15, 25) of the busbar (10, 20) arranged on a lateral wall (4) and at least one second contact (131, 132, 133) for contacting the busbar (30) arranged on the connecting wall (5), wherein the contacting element (120) comprises a rotatably supported base body (125) on which the first contact (127, 128) is laterally arranged, and the second contact (131, 132, 133) is arranged on a contact carrier (130) that does not rotate along with the base body (125).

17. The luminaire or electric unit (100, 150) for connecting to a mounting rail (1) as recited in claim 16 wherein the additional busbar (30) arranged on the connecting wall (5) of the mounting rail profile (2) includes a guide groove, and the contact carrier (130) for the second contact includes a guide element that engages the guide groove on the additional busbar to prevent the contact carrier from rotating.

18. A mounting rail (1) for luminaires (100, 150) or electric units, said mounting rail comprising:

a mounting rail profile (2) enclosing an elongated receiving chamber (3), wherein the mounting rail profile (2) comprises two lateral walls (4) as well as a connecting wall (5) which connects the lateral walls (4) to one another, said walls together enclosing the receiving chamber (3);

a busbar (30) arranged on the connecting wall in the mounting rail profile (2), said busbar having contactable lines (35), wherein the busbar (30) comprises at least two adjacently arranged regions (33, 34) with contactable lines (35), wherein one of the two regions (34) is designed to be rearwardly offset from the other region (33) when viewed transversely in relation to a longitudinal direction of the elongated receiving chamber (3); and the connecting wall of the mounting rail profile (2), on which wall the busbar (30) is arranged, is designed to be profiled such that an elongated channel (8) extending the receiving chamber (3) is formed, in which channel (8) the rearwardly offset region (34) of the busbar (30) is arranged.

19. The mounting rail according to claim 18, wherein the busbar (30) comprises adjacently arranged three regions (33,

34), wherein two outer regions (33) run in a common plane and a middle region (34) is designed to be rearwardly offset from the outer regions (33).

20. The mounting rail according to claim 18, wherein the lines (35) of the busbar (30) are supported in a line retention profile (31) consisting of an insulating material, which profile forms grooves or channels (32) opening towards a contacting side, wherein the different regions (33, 34) of the busbar (30) use a common line retention profile (31).

21. The mounting rail according to claim 18, wherein walls (5, 9) of the channel (8) or of the mounting rail profile (2) in which the additional busbar (30) or the rearwardly offset region (34) of the additional busbar (30) are arranged comprise openings or regions to be opened, which allow access to the lines (35) that are contactable from outside the mounting rail profile (2).

22. The mounting rail according to claim 18, wherein at least some of the lines (35) of the rearwardly offset region (34) of the busbar (30) are contactable at least in sections from outside the mounting rail profile (2).

23. The mounting rail according to claim 22, wherein walls (5, 9) of the channel (8) comprise openings or regions to be opened, which allow access to the lines (35) that are contactable from outside the mounting rail profile (2).

24. The mounting rail according to claim 23, wherein the regions to be opened are formed by die-cuttings, which form bendable tabs or break-away regions in the wall (5, 9) of the channel (8).

* * * * *